US007117967B2

(12) United States Patent
Kidd et al.

(10) Patent No.: US 7,117,967 B2
(45) Date of Patent: Oct. 10, 2006

(54) WHEEL CHAIR APPARATUS AND METHOD

(76) Inventors: William W. Kidd, 414 S. Grove St., Lexington, IL (US) 61753; John P. Jenkins, 414 S. Grove St., Lexington, IL (US) 61753

( * ) Notice: Subject to any disclaimer, the term of this patent is extended or adjusted under 35 U.S.C. 154(b) by 147 days.

(21) Appl. No.: 10/832,939

(22) Filed: Apr. 27, 2004

(65) Prior Publication Data

US 2005/0236194 A1 Oct. 27, 2005

(51) Int. Cl.
*A61G 5/04* (2006.01)
*B62D 61/12* (2006.01)

(52) U.S. Cl. ........................................ 180/209; 180/13

(58) Field of Classification Search .................. 180/11, 180/12, 13, 16, 65.1, 213, 214, 209
See application file for complete search history.

(56) References Cited

U.S. PATENT DOCUMENTS

| | | | | |
|---|---|---|---|---|
| 1,686,427 A | * | 10/1928 | Wallgren | 280/87.041 |
| 2,726,726 A | * | 12/1955 | Le Tourneau | 180/65.5 |
| 2,978,053 A | * | 4/1961 | Schmidt | 180/12 |
| 3,349,862 A | * | 10/1967 | Shirey, Jr. | 180/209 |
| 3,688,857 A | * | 9/1972 | Miller et al. | 180/6.5 |
| 3,705,638 A | * | 12/1972 | Shock | 180/14.3 |
| 3,783,359 A | | 1/1974 | Malkiel | |
| 3,912,032 A | * | 10/1975 | Benz et al. | 180/13 |
| 4,386,672 A | * | 6/1983 | Coker | 180/13 |
| 4,503,925 A | | 3/1985 | Palmer et al. | 180/13 |
| 4,814,674 A | | 3/1989 | Krassky | 318/254 |
| 4,841,207 A | | 6/1989 | Cheyne | 388/811 |
| 5,016,720 A | * | 5/1991 | Coker | 180/13 |
| 5,050,695 A | | 9/1991 | Kleinwolterink, Jr. | 180/13 |
| 5,101,924 A | | 4/1992 | Yamagiwa et al. | 180/220 |
| 5,125,468 A | * | 6/1992 | Coker | 180/13 |
| 5,194,794 A | | 3/1993 | Shamoto | 318/603 |
| 5,207,286 A | * | 5/1993 | McKelvey | 180/13 |
| 5,222,572 A | | 6/1993 | Yamagiwa et al. | 180/220 |
| 5,291,959 A | * | 3/1994 | Malblanc | 180/11 |
| 5,305,845 A | * | 4/1994 | Van Dooren | 180/65.1 |
| 5,376,868 A | | 12/1994 | Toyoda et al. | 318/587 |
| 5,427,193 A | | 6/1995 | Avakian | |
| 5,440,915 A | | 8/1995 | Storar | |
| 5,471,384 A | | 11/1995 | Nakashima et al. | 364/424.01 |

(Continued)

FOREIGN PATENT DOCUMENTS

JP 59164228 A * 9/1984

*Primary Examiner*—Lesley D Morris
*Assistant Examiner*—Daniel Yeagley
(74) *Attorney, Agent, or Firm*—Husch & Eppenberger LLC; Robert C. Haldiman

(57) ABSTRACT

A wheel chair drive apparatus includes a frame having a wheel mount, a battery mount, and a control shaft mount. A drive wheel has a drive motor incorporated within the drive wheel. A battery is in operative communication with the drive motor via a detachable jack. A battery housing is dimensioned to mount in the battery mount of the frame and has a handle. A control shaft pivotably mounted on the control shaft mount, so that it has a stow position, and operating position, a user entry position and a table use position. A caster lever is pivotably mounted to the frame, so that it has a rolling position and an engaged position. The caster lever is disposed to engage a receiving seat on a wheel chair. A locking lever is releasably biased toward a position locking the caster lever in the engaged position.

29 Claims, 18 Drawing Sheets

U.S. PATENT DOCUMENTS

| | | | | |
|---|---|---|---|---|
| 5,494,126 | A | 2/1996 | Meeker | 180/13 |
| 5,501,480 | A * | 3/1996 | Ordelman et al. | 280/304.1 |
| 5,531,284 | A * | 7/1996 | Okamoto | 180/65.1 |
| 5,651,422 | A * | 7/1997 | Casali | 180/13 |
| 5,691,584 | A | 11/1997 | Toida et al. | 310/67 R |
| 5,721,473 | A | 2/1998 | De Vries | 318/139 |
| 5,735,361 | A * | 4/1998 | Forrest | 180/6.24 |
| 5,796,192 | A | 8/1998 | Riepl | |
| 5,826,670 | A * | 10/1998 | Nan | 180/15 |
| 5,901,268 | A | 5/1999 | Ando et al. | |
| 6,060,859 | A | 5/2000 | Jonokuchi | 318/80 |
| 6,247,548 | B1 * | 6/2001 | Hayashi et al. | 180/206 |
| 6,278,216 | B1 | 8/2001 | Li | 310/254 |
| 6,302,826 | B1 | 10/2001 | Lee | 482/54 |
| 6,325,168 | B1 * | 12/2001 | Hillel | 180/14.1 |
| 6,388,405 | B1 | 5/2002 | Laurent | |
| 6,552,460 | B1 | 4/2003 | Bales | 310/156.35 |
| 6,556,458 | B1 | 4/2003 | Ohmura et al. | |
| 6,577,085 | B1 | 6/2003 | Maurice et al. | 318/254 |
| 6,630,764 | B1 | 10/2003 | Dubéet et al. | 310/177 |
| 6,647,325 | B1 | 11/2003 | Shimazaki et al. | |
| 6,690,127 | B1 | 2/2004 | Birkestrand et al. | 318/139 |
| 6,727,668 | B1 | 4/2004 | Maslov et al. | 318/138 |
| 6,758,291 | B1 * | 7/2004 | Koch | 180/11 |
| 6,766,871 | B1 * | 7/2004 | Sawyer | 180/13 |
| 6,883,632 | B1 * | 4/2005 | McHardy et al. | 180/315 |
| 6,888,280 | B1 | 5/2005 | Dube et al. | |
| 6,892,841 | B1 | 5/2005 | Makuta et al. | |
| 7,021,407 | B1 * | 4/2006 | Ruschke et al. | 180/11 |
| 2004/0108147 | A1 * | 6/2004 | Ross | 180/13 |
| 2004/0144580 | A1 * | 7/2004 | Wu | 180/68.5 |
| 2004/0182615 | A1 * | 9/2004 | Matte | 180/68.1 |

* cited by examiner

WHEEL CHAIR APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is in the field of motorized wheel chairs, particularly, separable apparatuses attachable to standard wheel chairs to provide power to drive them.

2. Related Art

Substantial obstacles to mobility and everyday tasks of living continue for those disabled and bound to wheel chairs. There is a continuing need to make mobility for the wheel chair bound more reliable and convenient.

Motor drives for standard wheel chairs exist in the prior art. U.S. Pat. No. 5,494,126 to Meeker and U.S. Pat. No. 5,050,695 to Kleinwolterink Jr. describe motor drive units that may be attached to standard push wheel chairs.

U.S. Pat. No. 5,050,695 describes a geared brush type DC motor chain coupled to a very small drive wheel. It makes use of a fixed steering column. Only the height of the column can be adjusted to fit individual needs, by loosening a setscrew. The drive wheel is coupled to a frame though a bearing journal. The frame forms a well into which two large batteries are supported. Power is applied to the motor through a cable and is controlled with the control box at the top of the steering column. The speed and direction of the motor is accomplished through wings attached to the control box. The wings are attached to simple switches inside the control box. The patent further describes pivotal frames attached to the rear section of the wheel chair frame. Attached to the pivotal frames are sockets into which an inverted U-shaped crossbar is inserted. When the unit is connected to the wheel chair, two hooks on the rear of the frame hook onto the U-shaped crossbar, which lifts the rear of the frame. Two rails on each side of the frame come in contact with the X-frame of the wheel chair and this lifts the front of the wheel chair. This procedure locks the unit in place.

U.S. Pat. No. 5,494,126 describes an apparatus and method for attaching a motorized wheel to a wheel chair. This unit is attached to the front of the wheel chair through the use of two brackets bolted to the front tubes of the wheel chair. The steering column is telescopically connected to the drive wheel and held in place with a collar and a setscrew. When connecting the drive unit to the wheel chair the steering column is replaced with a temporary installation handle. After the installation handle has been inserted it is held in place with a collar and set screw. The unit is then held in a partially upright position and two posts are guided into the C shaped openings of the brackets on either side of the front of the wheel chair. The occupant then presses forward on the installation handle forcing the drive wheel back under the front of the wheel chair. After the drive wheel is all the way under the front of the wheel chair the operator must then hold it in place and slide two pins into the brackets on either side of the wheel chair. These locking pins are then held in place with locking screws. The operator must then loosen the setscrews holding the installation handle in place, remove the installation handle and then install the battery. Next replace the steering column and lock the steering column in place with a collar and setscrew. Two, wires with spade lugs must then be connected to the battery with terminal screws. It is possible to connect the wires backwards.

These devices are cumbersome in their operation, installation and transportation. The units are heavy and do not disassemble or collapse into a compact package. This creates difficulty in packing, as for example in the trunk of an automobile. Weight represents a substantial hardship, particularly for the elderly person, whose caregiver is commonly an elderly spouse. Prior art devices are also bulky and do not collapse into a small enough package for convenient transportation, again as in the trunk of a car.

The prior art units do not have batteries that are easily removable. Moreover, the batteries are not encased in a separate housing. Accordingly, separate packaging of the batteries is required to transport prior art batteries on public transportation such as commercial airlines. There is no provision for re-charging the batteries.

The prior art devices have in common a vertical shaft for holding a control module where the wheel chair occupant may reach it. This shaft is not movable, and accordingly obstructs ingress and egress from the wheel chair. The unadjustable vertical control shaft makes simple tasks difficult, such as pulling the chair up to the table, as for reading or a meal.

These units are also difficult to install for a caregiver. They are prohibitively difficult for the disabled individual themselves to install. This is due to the mounting apparatus, which cannot automatically seat itself by simple engagement with the chair, which has no alignment guides to ease installment and which also prevents folding the chair up for storage when the apparatus is attached.

The prior art devices have inefficient drive trains that use drive chains and further necessitate inefficient gearing and small drive wheels. Their systems are only 35% efficient. This inefficiency leads to a choice between either large, heavy batteries or smaller batteries that use an inordinate amount of power with an appreciably shorter charge life.

In operation, the prior art units use small drive wheels that too readily transfer shock from minor impediments, such as a brick floor. Even slightly larger objects, such as a cobble stone street, become virtually impossible to traverse.

It is in view of the above referenced shortcomings that the present invention was developed.

SUMMARY OF THE INVENTION

The invention is an improved drive device for attachment to the standard wheel chair. The device is separable into two separate components for transportation. One component is a battery, contained in a separate, sealed housing. The battery and housing have a separate handle and are dimensioned to be of a convenient size and weight. The remaining second component includes a frame, high torque electric motor, drive wheel, and collapsible control shaft.

This invention consists of a motorized wheel chair drive unit providing steerable motive power, which can be easily attached to or detached from a standard manual wheel chair and makes use of a direct drive system. This drive requires no gear reducers and no coupling mechanisms such as chains or belts. This drive system is much more efficient than those used in prior art. The efficiency is approximately 80%. This allows a choice between using a smaller battery which travels the same time and distance as prior art, and using a full-size battery which travels a much greater distance without recharging. It is preferred to use a smaller battery, which in this design is enclosed in a steel case.

The drive motor is inside the drive wheel in one embodiment. In another, the wheel is the motor. It is an inverted rotor design with a stationary stator at the center of the motor and the rotor on the outside. The tire is molded directly on the outside of the rotor.

The motor wheel has a relatively large diameter of eight and half inches. This permits easy passage over fairly large obstructions such as doorsills. The motor incorporates two large permanently lubricated sealed ball bearings. The wiring passes out through the center of one of the bearings, up under a protective cover to the electronic control box located above the motor The unit overcomes restrictions of prior art of approaching a desk, a table, a bathroom sink, a water fountain and a myriad of other places by allowing the steering column to be released and rotated back in the operator's lap. From the locked upright position, the steering column can also be folded forward down against the floor and then turned to the side, providing complete open access for entering and leaving the wheel chair. There is a release knob, located near the front edge of the wheel chair seat, which provides easy access for moving the steering column. When the release knob is pulled, the motor control is automatically turned off. In order to allow this feature to be effective the motor control head at the top of the steering column must be very slim and small. With the unit disconnected from the wheel chair and the battery pack removed, the steering column can then be folded down over the top of the frame where it locks in a centered position. This minimizes the space required for storing the unit and also provides a handle for moving the folded unit.

The process of connecting and disconnecting the unit with the wheel chair is quick and easy, requiring no tools, allowing a handicapped person to fix the drive apparatus in place under the wheel chair for use.

There are two lightweight brackets bolted to the inside rear of the wheel chair frame with outward slanted guides. There are engagement seats for the driver apparatus formed on the inner surface of these brackets. A swing assembly or caster lever is hinged at the rear of the drive apparatus' frame. It rotates out approximately 45°. The swing assembly rotates over center and is held in the out position by the weight of the battery, and supported by two roller casters. The swing assembly supports a horizontal rectangular bar, which is transverse to the wheel chair and extends almost the full width of the inside of the wheel chair frame. The casters are mounted near the outer end of this horizontal bar. Mounted to the top of the battery handle is an inverted V Delrin®acetal resin slide. To connect the unit, the swing assembly must be in the out position, and the steering column turned at 90° (to act as a brake). The wheel chair is moved over the drive unit, and as the horizontal bar comes in contact with the slanted guides on the wheel chair brackets the roller casters allow the unit to be guided laterally until the rectangular bar is captured by the engagement seats on the wheel chair brackets. As the wheel chair moves further forward, the swing assembly is driven to an upright vertical position. It is held in this vertical position by a releasable latch mechanism. As the swing assembly is driven to the upright vertical position, the rear of the frame is lifted which pushes the inverted V Delrin®acetal resin slide against the bottom of the X-frame of the wheel chair. This lifts the front of the wheel chair and at the same time the roller casters are lifted off the ground. With the front of the wheel chair lifted, needed weight is added to the motor wheel providing better traction.

A second means of connecting the unit can be accomplished by applying the brakes on the wheel chair. The drive apparatus can then be backed under the wheel chair using the power of the drive unit. This design results in a three-wheeled device with a very short wheelbase. Since the front casters of the wheel chair are only slightly lifted off the ground, they serve as outriggers and prevent the unit from tipping.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 15:
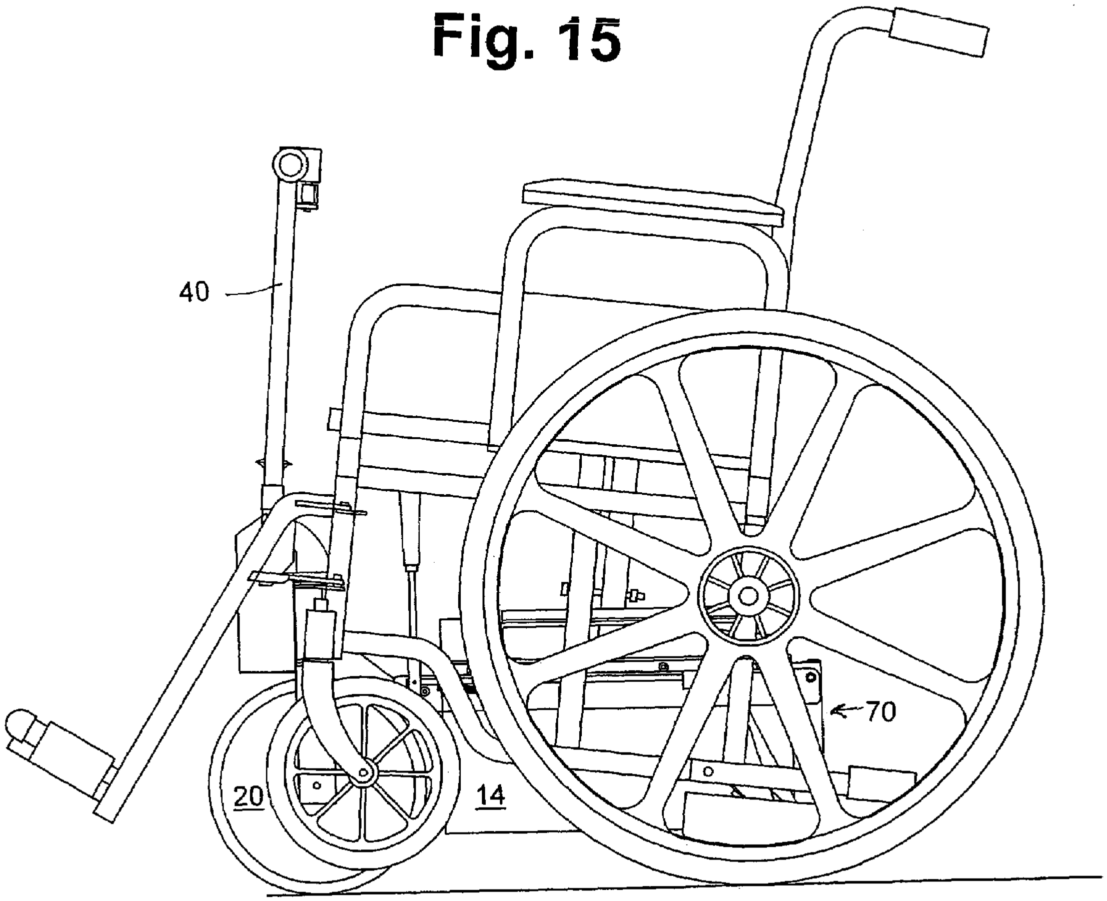
FIG. 15 is a side view of the unit installed for operation in the standard wheel chair.

Referring to the accompanying drawings in which like reference numbers indicate like elements, FIGS. 1, 2, 3, 4 and 5 are side, front, side and top views, respectively, of the wheel chair motor drive of the present invention. FIG. 15 shows the motor drive apparatus 10 engaged with a wheel chair.

The wheel chair motor drive apparatus 10 is comprised of a frame 12 and, when assembled, a battery housing 14.

Drive wheel 20 comprises the housing for a high torque electric motor (not shown) within the wheel in the depicted embodiment. The wheel 20 is also the rotor of the electric motor, as well as the casing for the stator housed within it. The motor and wheel 20 are coaxial in the depicted embodiment. The wheel 20 also has a friction surface or tread 22 disposed circumferentially thereon.

The drive wheel axle 24 supports drive wheel forks 26. The forks 26 are fixedly attached to a fork bearing journal 28 which is substantially vertical in the depicted embodiment.

The frame 12 is essentially comprised of a front frame component 30, arm 32 and battery mount 34.

A control shaft 40 is fixedly attached to control shaft bracket 42. The control shaft bracket 42 is attached at pivot 44 to the front frame component 30.

Figure 13:
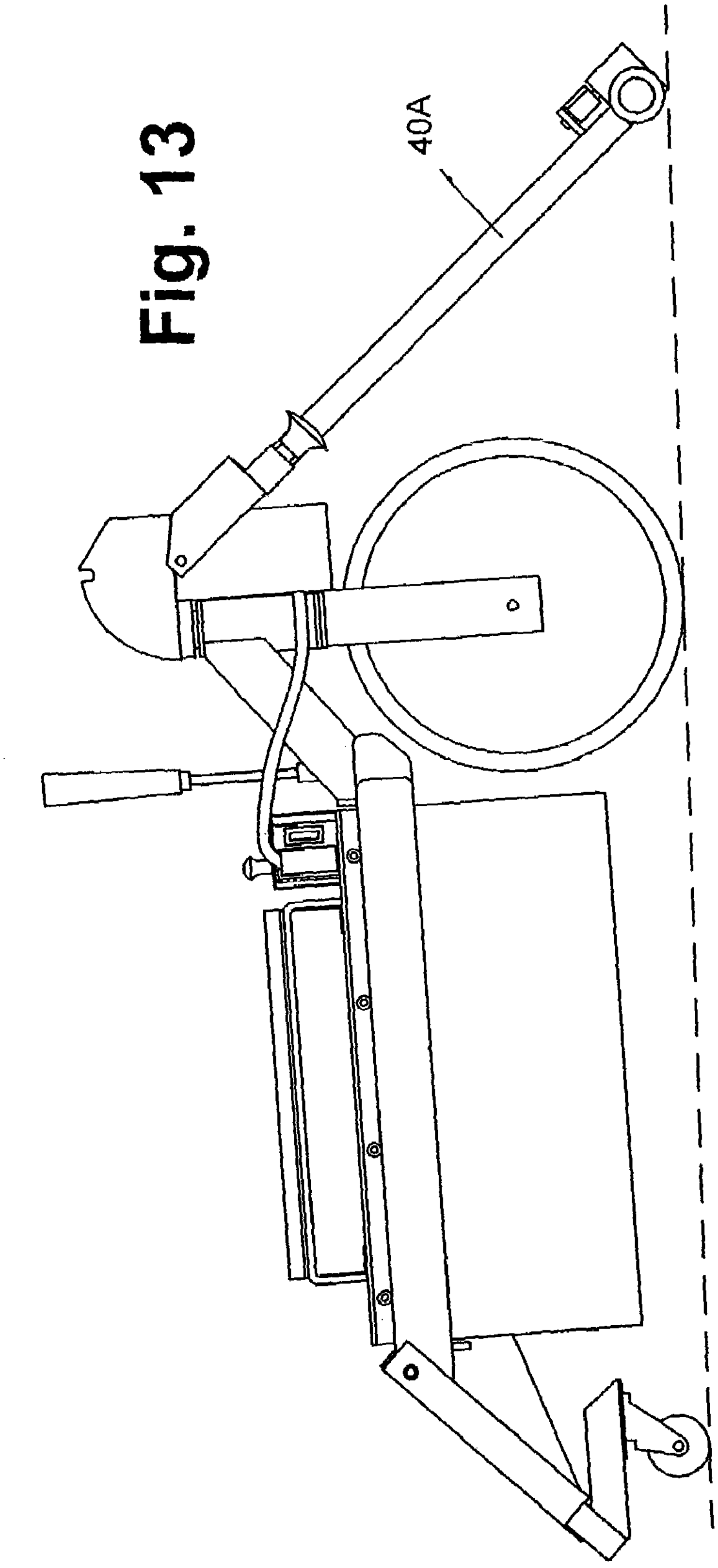
FIG. 13 is a right sided view with the controls shaft in a user access position.
Figure 14:
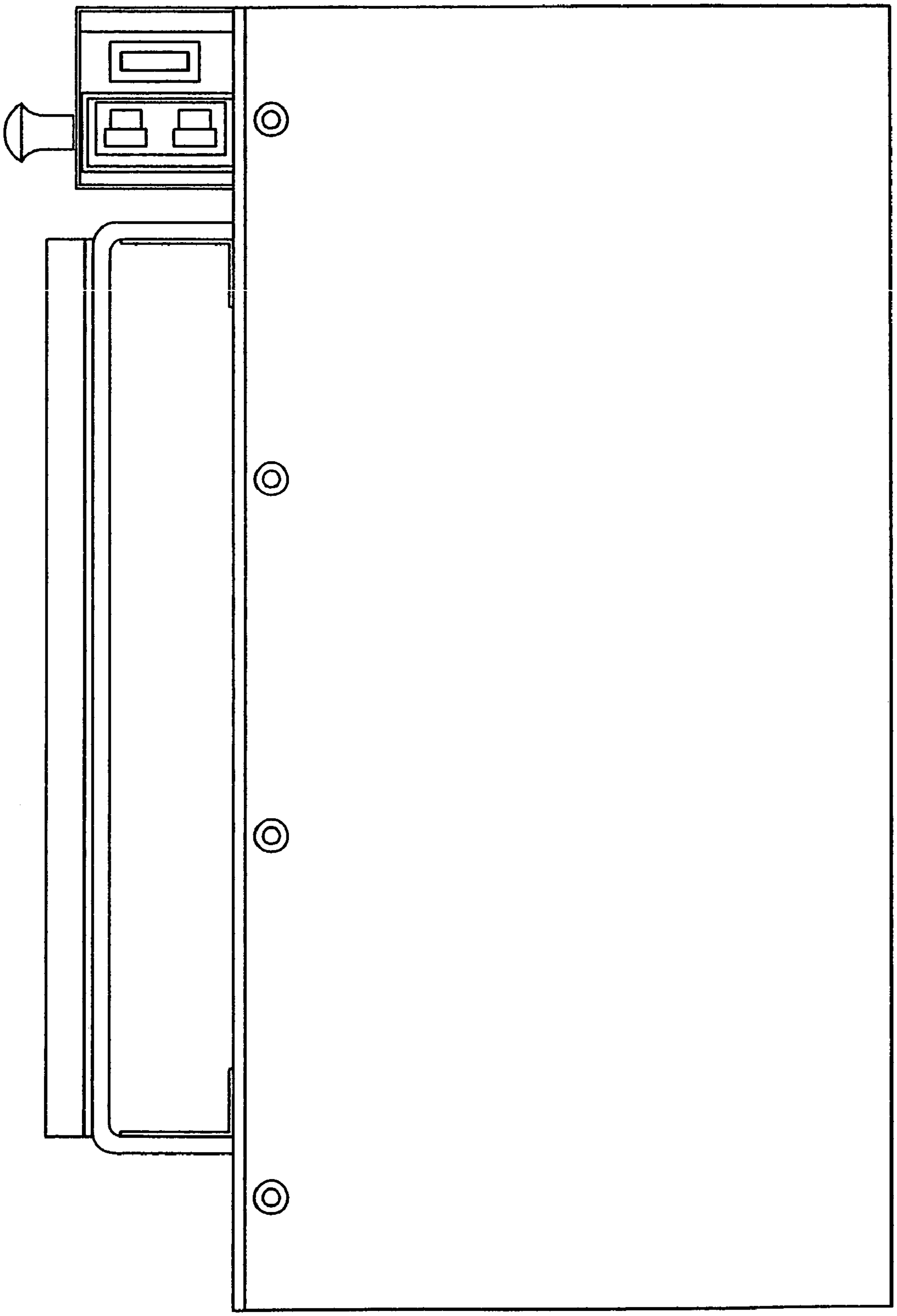
FIG. 14 is a close up view of the battery housing.

Control shaft bracket 42 straddles a control shaft positioning disk 38. Control shaft 40 can pivot around pivot 44 through an arc that is forward and back, when drive wheel 20 is pointed frontwards. The position of the control shaft 40 may be selectively maintained at different positions along its arc of travel. In the depicted embodiment, bosses and detents (not shown) engaging between control shaft bracket 42 and an engaging edge of the control shaft position disk 38 are actuated by control shaft locking pin 46, which spring biases a pin (not shown) in any of the series of detents (not shown) along a circumferential surface of control shaft positioning disk 38. An alternative within the scope of the present invention is a friction engagement between a control shaft locking member and the control shaft position disk, allowing a continuous range of selectable positions from control shaft 40. In any case, control shaft 40 may be positioned in a fully forward location, 40A (FIG. 13). This position, which in the depicted embodiment would place the top end of the control shaft 40 on or near the floor, allows for greatly simplified egress and ingress of the wheel chair occupant in and out of the wheel chair with the wheel chair drive unit 10 positioned under the wheel chair and either engaged with the wheel chair or ready for engagement with it.

Figure 9:
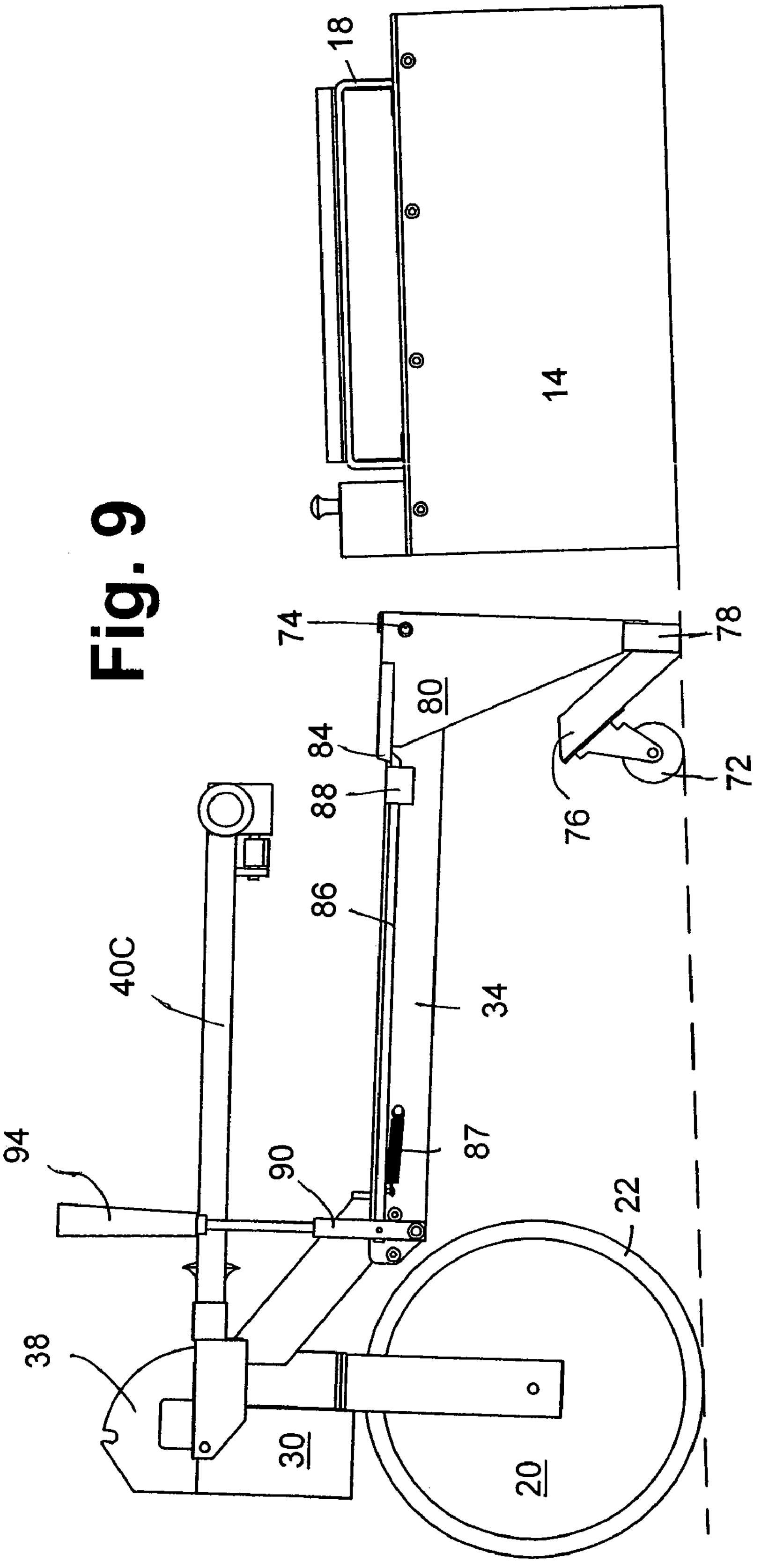
FIG. 9 is a side view of the drive apparatus with the battery removed and the control shaft collapsed for storage.
Figure 10:
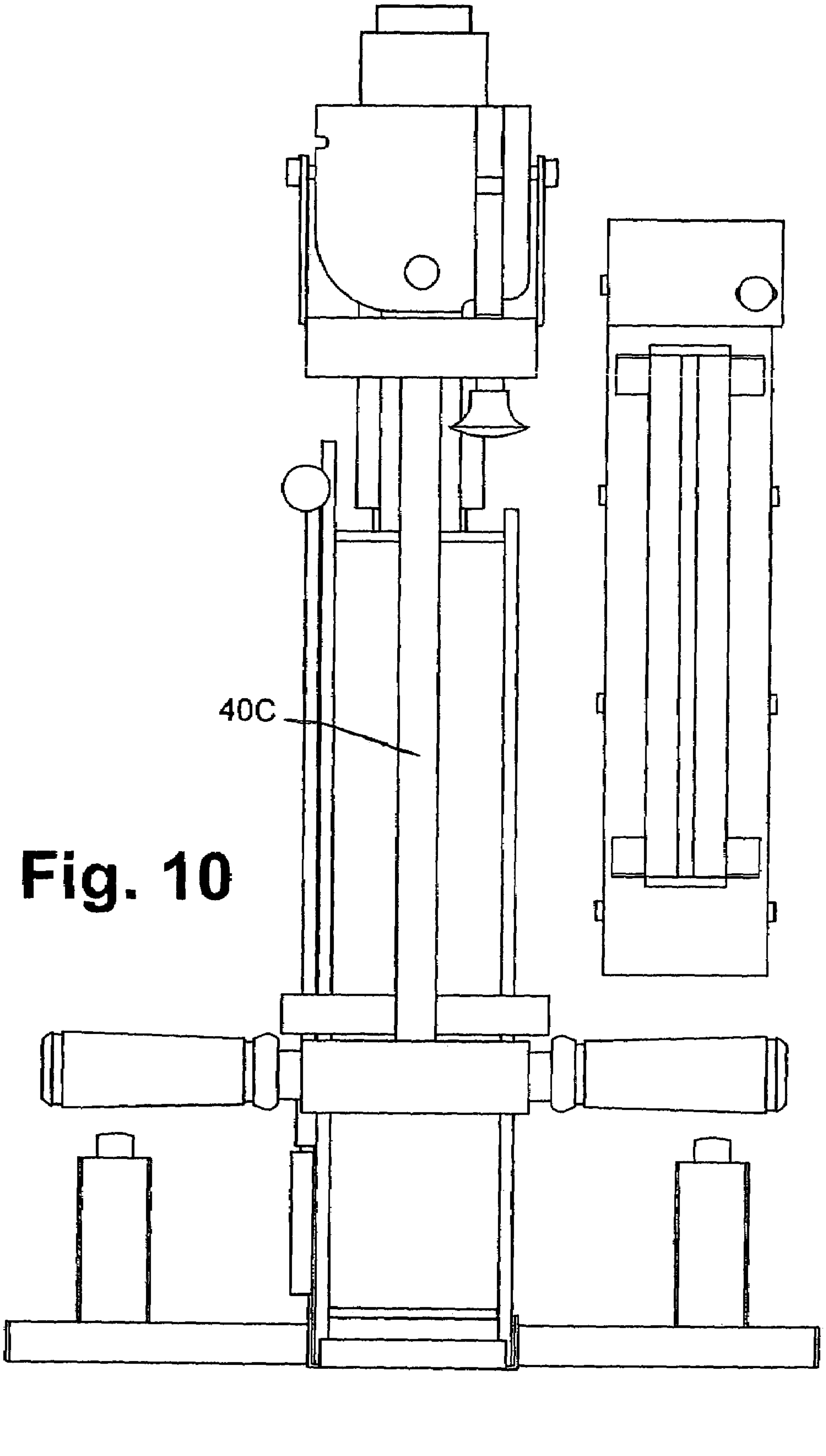
FIG. 10 is a top view of the drive apparatus with the battery removed and the control shaft collapsed for storage.

A fully retracted or backwards position of shaft 40, position 40C (FIGS. 9, 10 and 11), is for stowing the wheel chair drive apparatus 10. Position 40C provides a compact dimension and smaller overall package size, which facilitates storing the wheel chair drive apparatus in the trunk of a car, or in provided storage on public transportation or elsewhere in a home or office.

Figure 1:
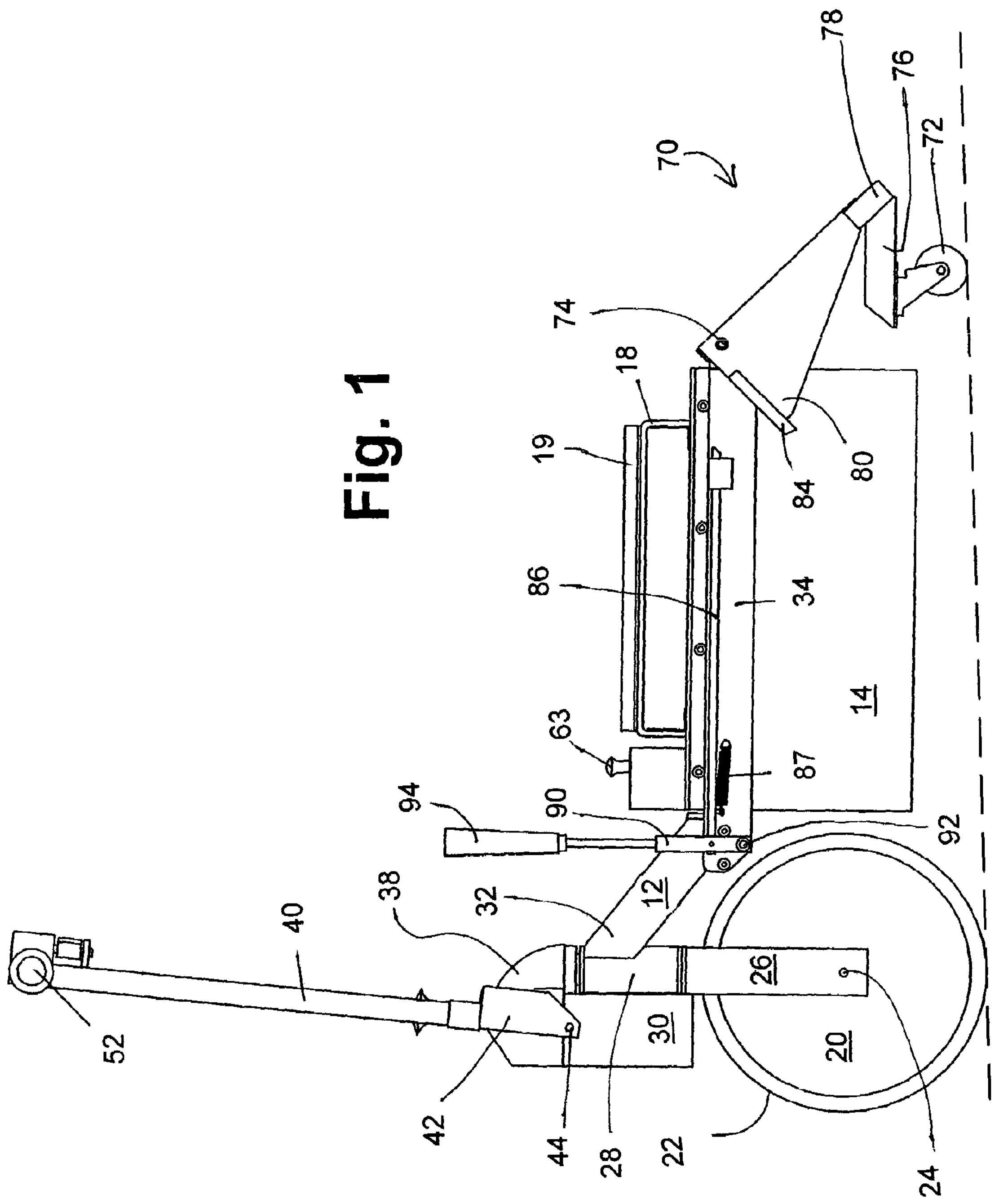
FIG. 1 is a left side view of the drive apparatus for a wheel chair.
Figure 2:
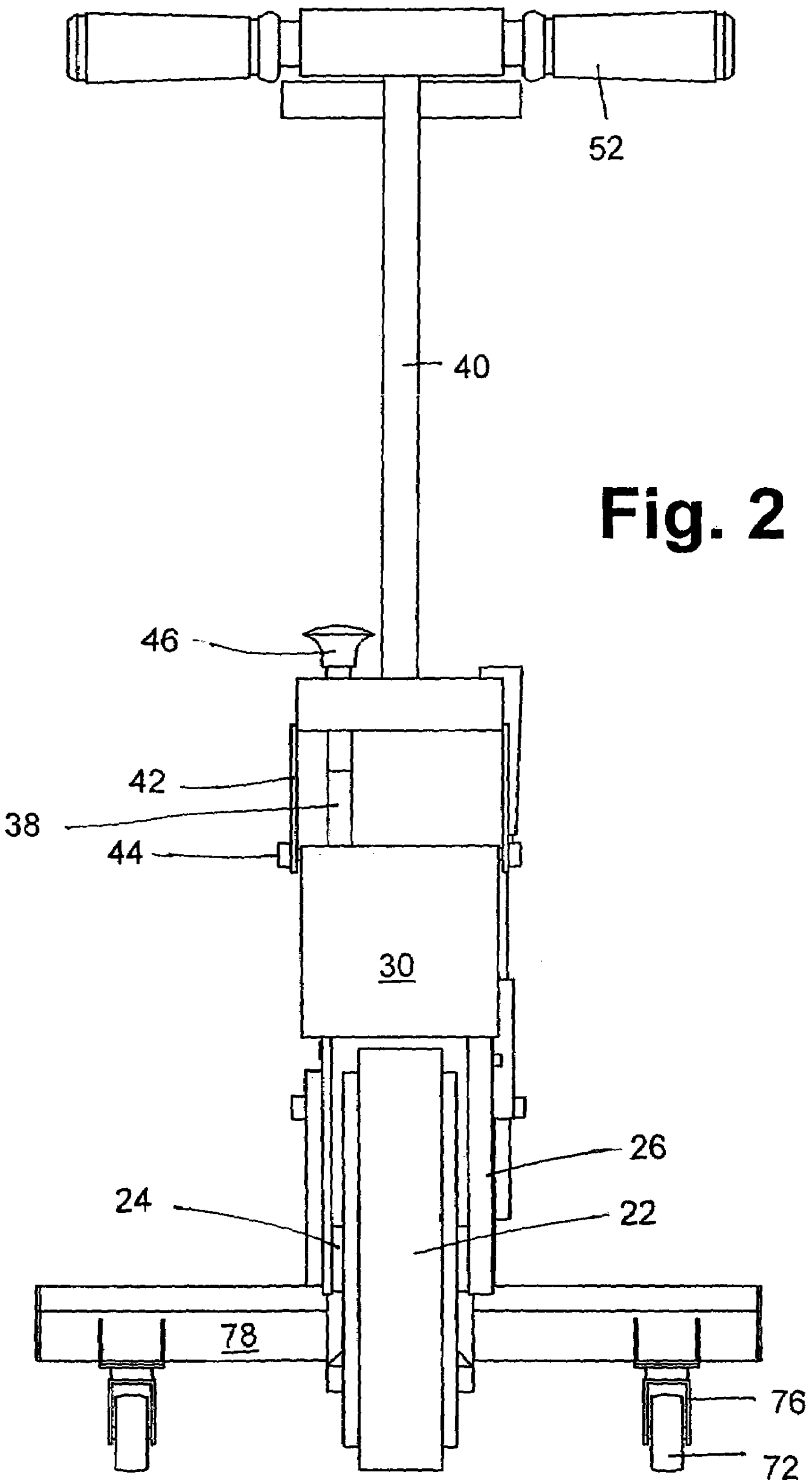
FIG. 2 is a front view of the drive apparatus for a wheel chair
Figure 3:
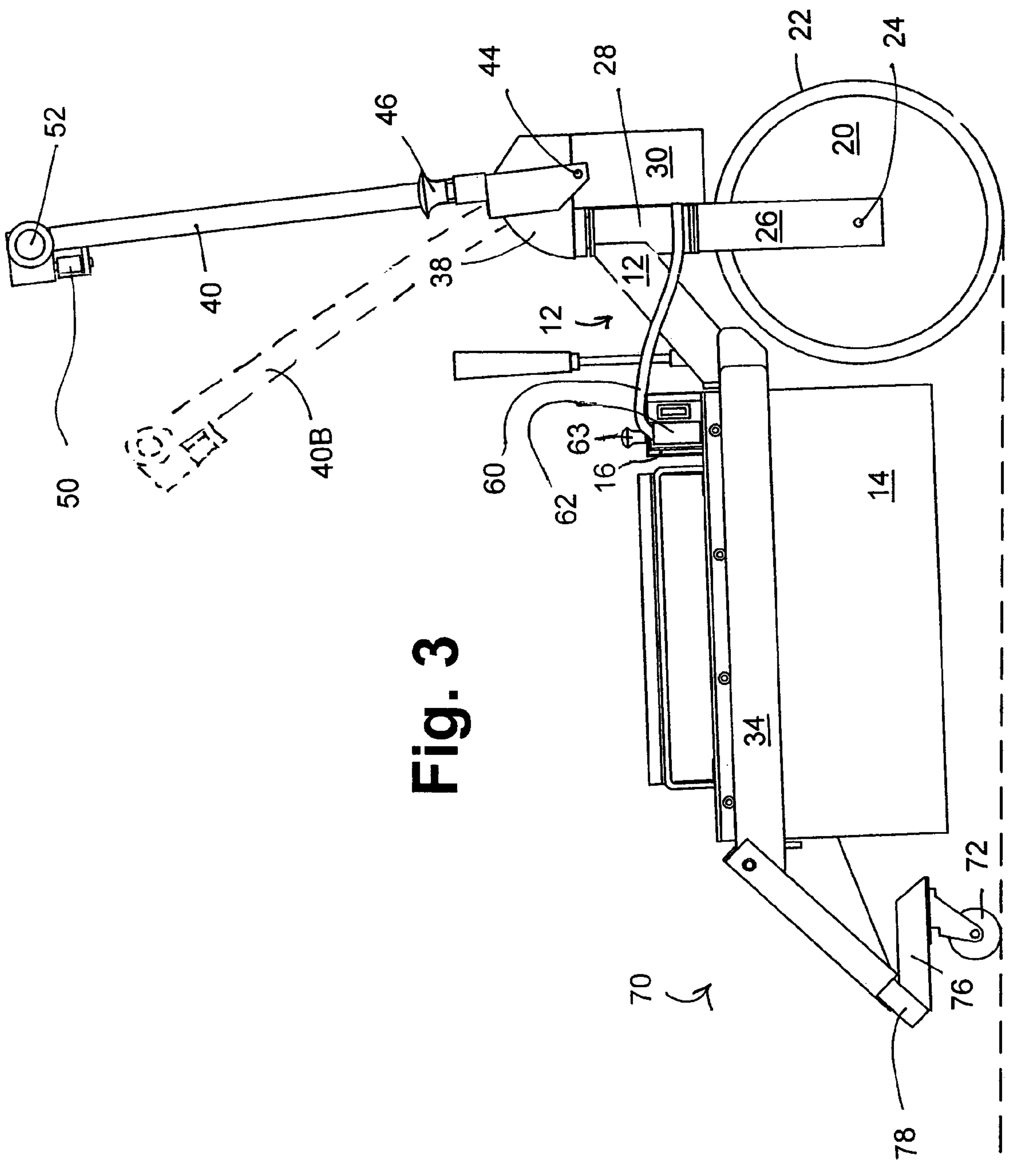
FIG. 3 is a right side view of the drive apparatus for a wheel chair.
Figure 4:
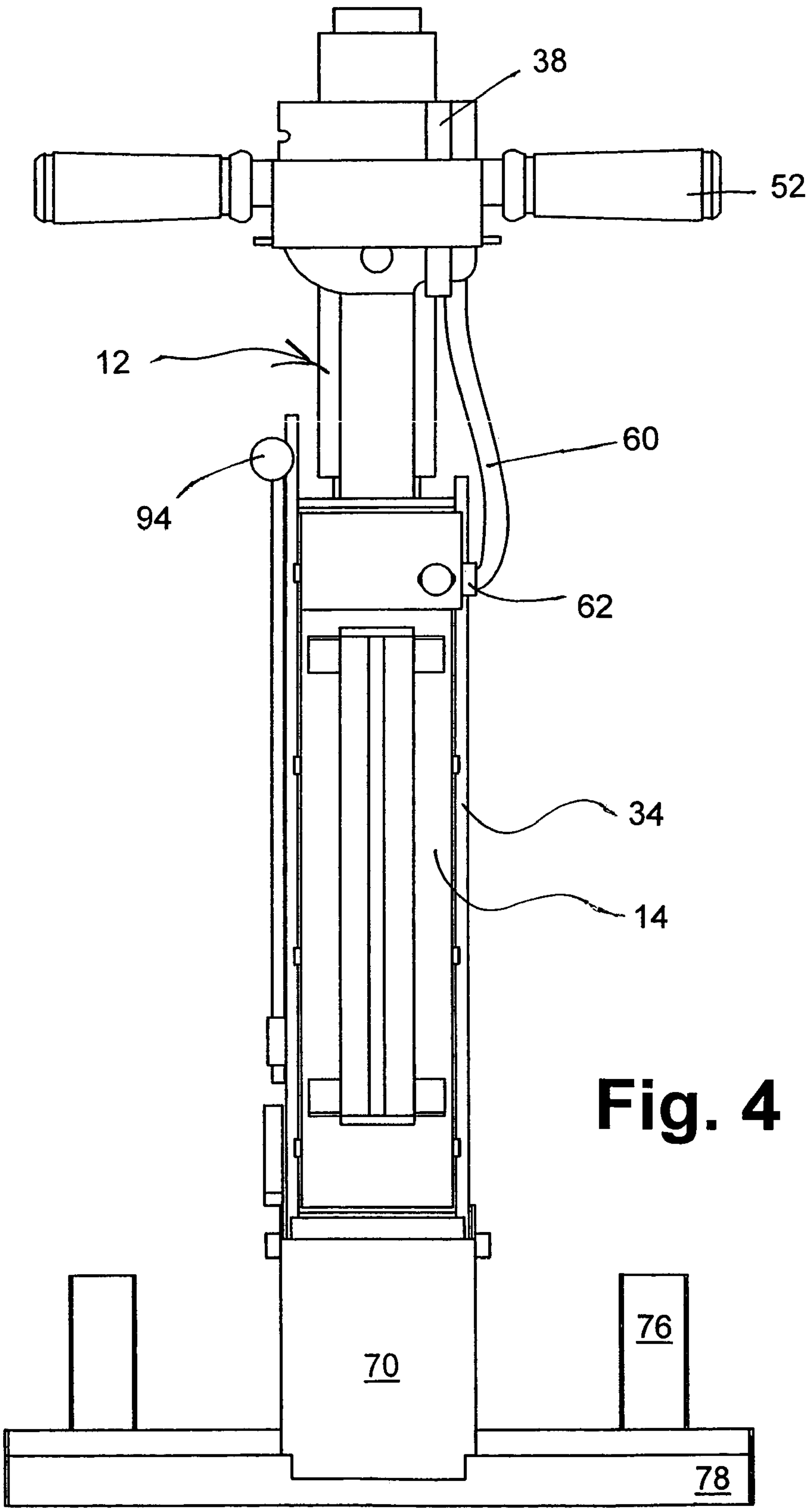
FIG. 4 is a top view.
Figure 5:
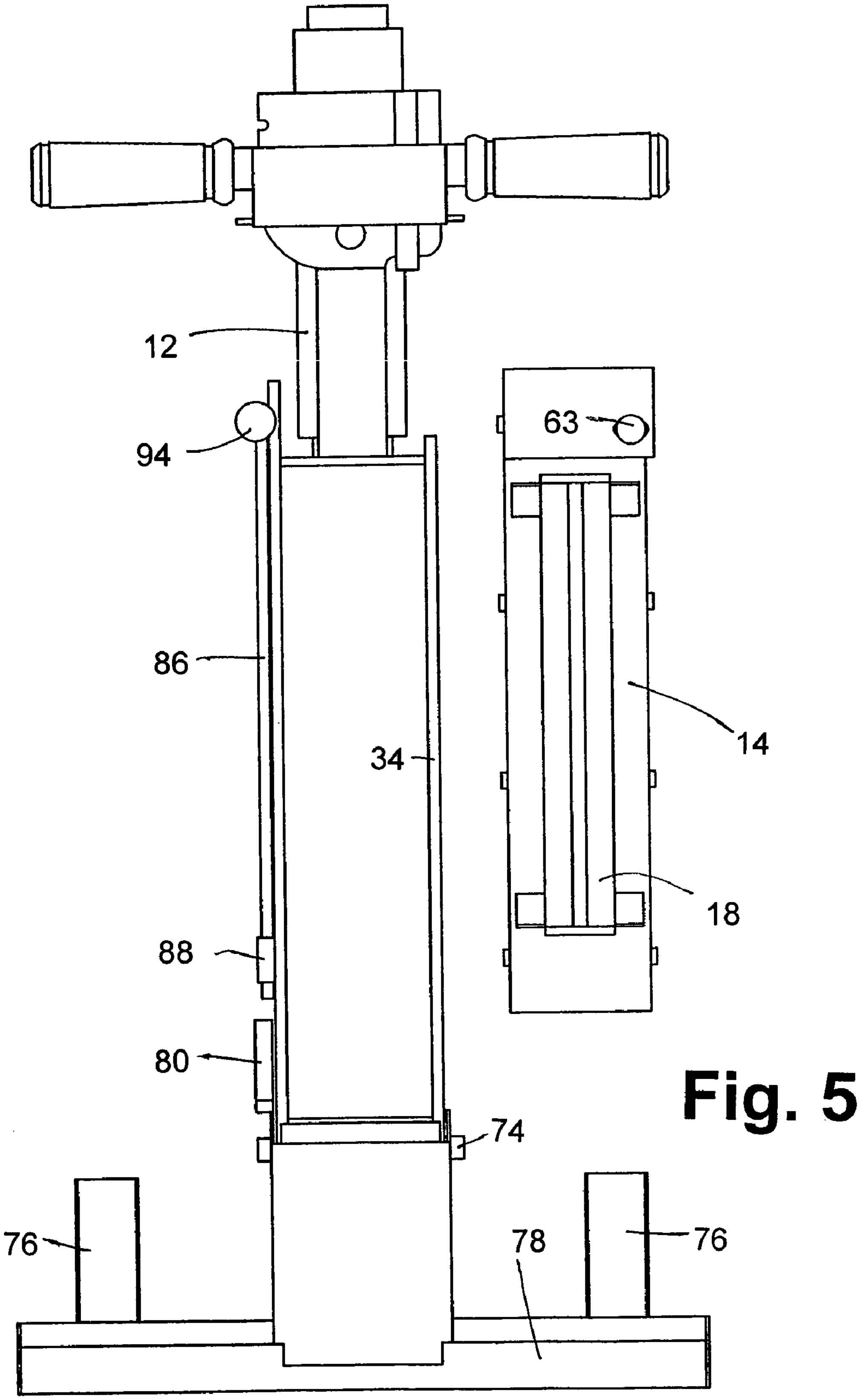
FIG. 5 is a top view with the battery removed.

Control shaft 40 may also be positioned at table position 40B (in phantom, FIG. 3). The prior art mounted adjustable control shafts restricted the proximity the wheel chair occupant could achieve to a table or sink for activities of daily living such as eating a meal, reading or washing. Position 40B allows a control shaft 40 to move backwards towards the wheel chair occupants lap and allow the wheel chair occupant to move forward with his or her knees under a table, desk or sink which in turn facilitates a comfortable distance for eating, reading, washing or other activities.

Figure 12:
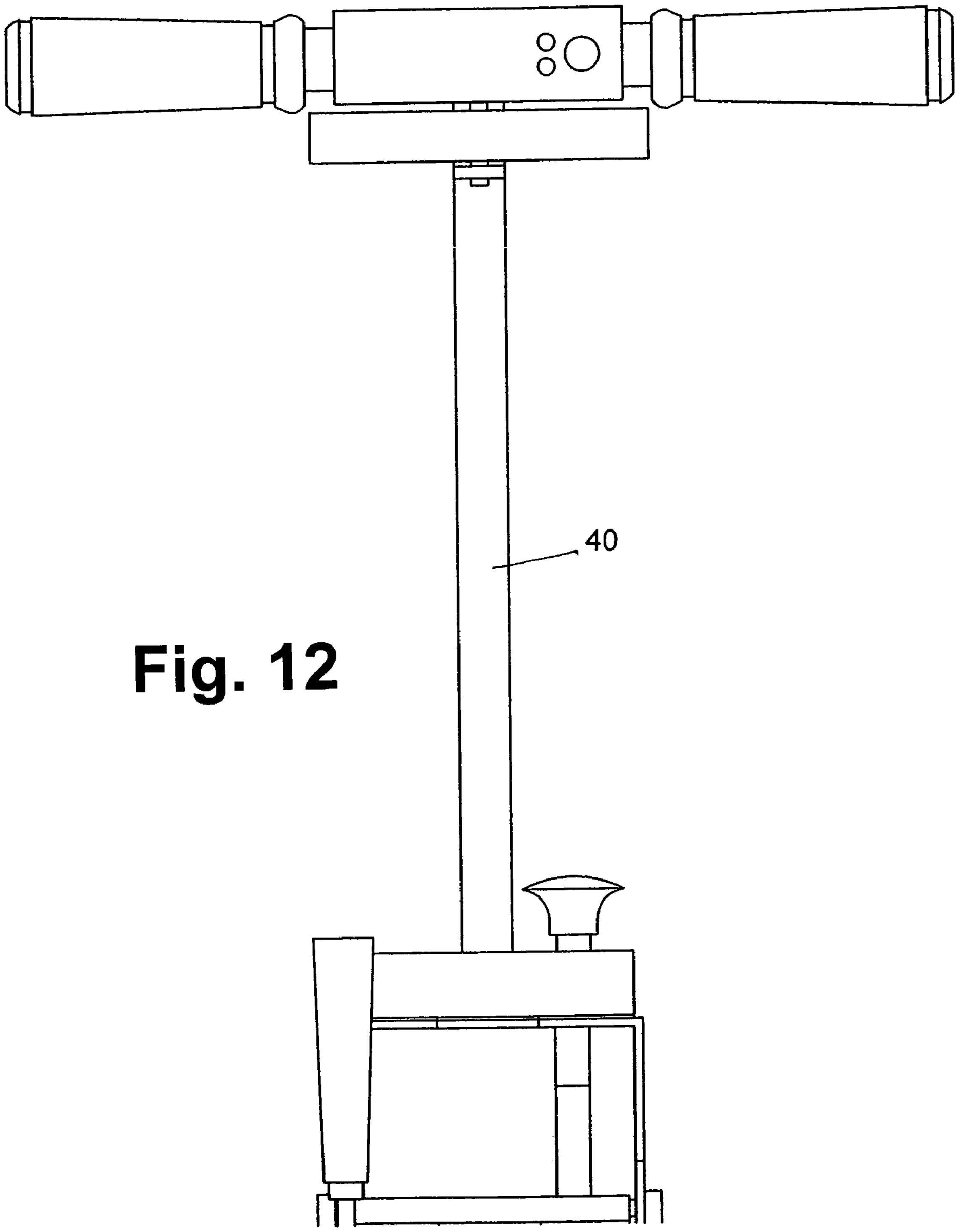
FIG. 12 is a close up of the control module.

On top of control shaft 40 are located controls, such as throttle 50, displays (FIG. 12) and handle bars 52.

Power for the wheel chair drive apparatus of the present invention is DC. The DC battery is retained within a battery housing 14. This sealed housing is acceptable for public transportation such as commercial airlines, further easing travel for the disabled, who would otherwise need to make special arrangements for packaging an open battery for transportation.

The battery housing 14 includes a handle 18 and a power jack receptacle 16. The battery housing 14 is assembled with the wheel chair drive apparatus 10 by lowering it into the battery mount 34 of frame 12. In the depicted embodiment, the battery mount is simply two parallel steel rails dimensioned to receive the battery housing 14 and support its weight flanges on the sides of the top of the battery housing 14.

A power cord 60 has a jack 62 that may be engaged with the corresponding jack 16 during assembly in order that the battery within housing 14 can be electronically engaged with the electric motor within drive wheel 20. In the depicted embodiment, the power cord 60 progresses through front frame component 30 and down one arm of drive wheel fork 26 and enters the drive wheel casing 20 via a through hole in axle 24.

This battery pack is much lighter, approximately 30 lbs., and is internally fused with an enclosed protected connector. If needed, the system provides use of a second battery pack, which can be charging while the first is in use. The battery pack drops into the rectangular opening of the frame and is held in place by gravity. Four bolts located on either side of the battery pack, which holds the cover of the battery pack in place, prevents the battery pack from dropping through the rectangular opening in the frame. The connector is polarity keyed and rated at 50 amps with 10,000 insertions. To charge the battery, the connector providing power to the drive unit is removed from the battery and the battery charger connector is inserted into the battery pack. It is not necessary to remove the battery pack from the drive unit while charging. A connector of this quality requires high contact pressure and therefore an ejector mechanism 63 is preferred.

At the rear of the wheel chair drive apparatus 10 is the swing assembly 70. In the depicted embodiment, the swing assembly is a lever for casters 72. Swing assembly 70 has at least two positions. A first position is substantially upright, at right angles with the battery mount rails 34 (see FIGS. 8, 9, 10, 11 and 15). In this position, the swing assembly may be engaged with swing assembly brackets fixedly mounted to the wheel chair further explained below. In the first position, casters 72 are raised from and disengaged with the ground or floor. The first position is used for engagement with the wheel chair and use of the wheel chair drive assembly for powered driving of the wheel chair. The first position is also used for storage of the wheel chair drive assembly 10 when being transported or otherwise not in use (see, FIGS. 9, 10 and 11). With regards to storage, the first position provides a more compact package size, and maintains the casters 72 in a position disengaged with the ground.

Swing assembly 70 is engaged with the battery mounting rails 34 of frame 12 at pivot 74. Movement of pivot 74 allows for a swing assembly 70 to move into at least one other position. This other position is depicted in FIGS. 1, 3, 6 and 13. An intermediate position is show in FIG. 7. There it can be seen that casters 72 are rotated into a position engaging them with the ground for rolling. Caster mounts 76 are angled such that the castors roll in the second position and do not touch the ground in the first position. The caster mounts 76 are fixedly attached to the swing assembly horizontal bar 78. The swing assembly bar 78 engages with swing assembly mounting brackets, as is more fully described below. This second position of the swing arm assembly 70 is maintained in position and prevented from further backwards rotation by a stop engagement with the battery mounting rails 34 of frame 12. Although any stop arrangement is within the scope of the present invention, in the depicted embodiment, the stop is the leading edge of the horizontal member of the swing assembly, which comes into stopping contact with the top of battery mounting rails 34 when the swing assembly 70 has been rotated to a position engaging the casters 72 with the ground.

The swing assembly 70 includes a forward extension 80 having a locking notch 84. When fully engaged with the wheel chair for driving it, the wheel chair drive apparatus 10 transfers forwards, backwards and turning drive force to the wheel chair through the close, fitted engagement of swing assembly horizontal bar 78 with the horizontal bar mounting brackets, which are fixedly attached to the wheel chair. Accordingly, it is important that swing assembly 70 be securely maintained in its upright, first position when the wheel chair drive assembly is in use. This secure maintenance of the first position is achieved in the depicted embodiment by a locking lever 86, best seen in FIG. 9. Locking lever 86 slides forwards and backwards and its rearward aspect is maintained in horizontal forward and back sliding engagement with battery mount 34 by sliding arm mount 88, which forstalls undesirable upwards and downwards movement of locking arm 86. The locking arm 86 is biased towards maintaining engagement with lock arm notch 84 by a spring 87. A locking arm release lever 90 is pivotedly attached to a frame 12 at pivot 92 and operated by a user with locking arm release lever handle 94.

Figure 6:
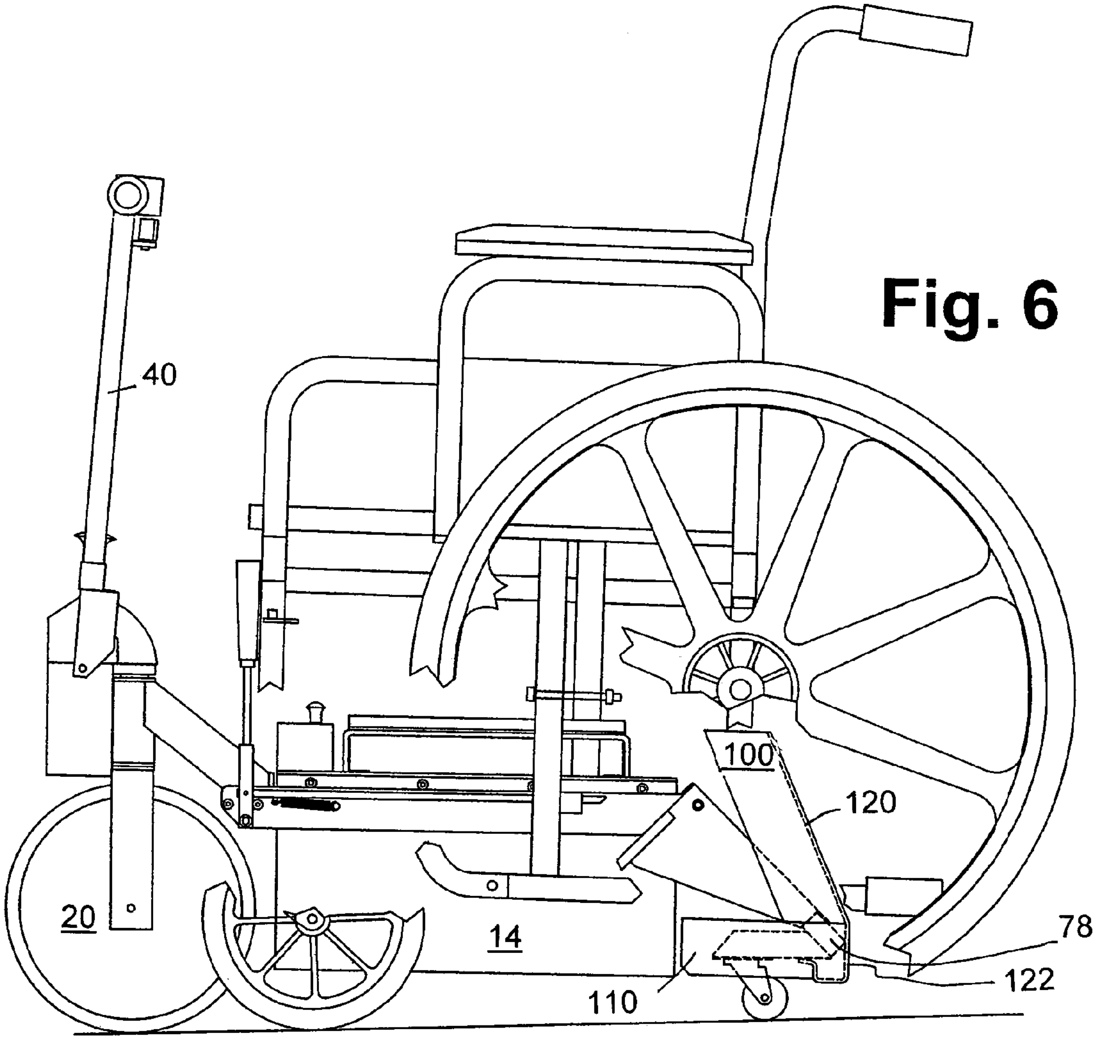
FIG. 6 is a side view with a cutaway depiction of the engagement of the swing arm assembly with the wheel chair mounting brackets in a first position.
Figure 7:
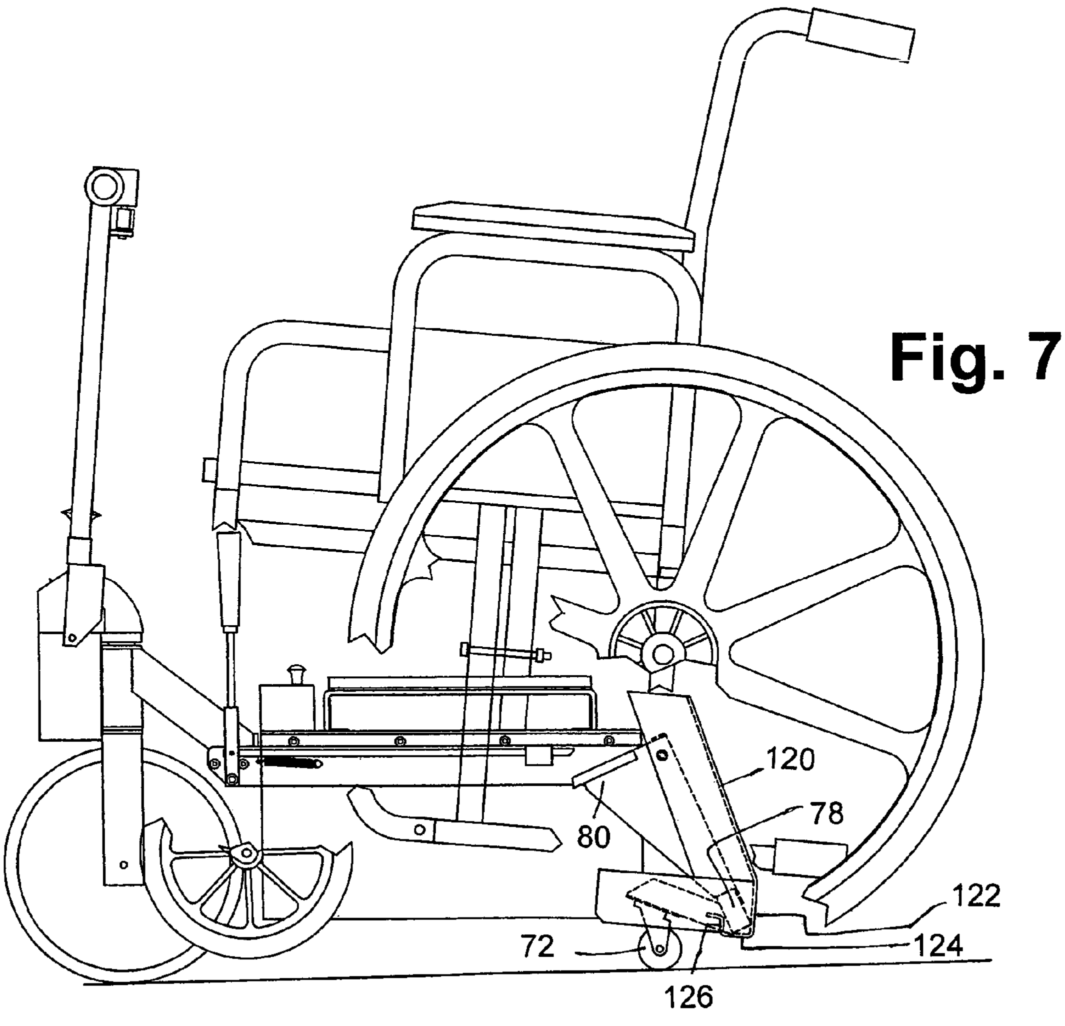
FIG. 7 is a side view with a cutaway depiction of the engagement of the swing arm assembly with the wheel chair mounting brackets in a continuing position.
Figure 8:
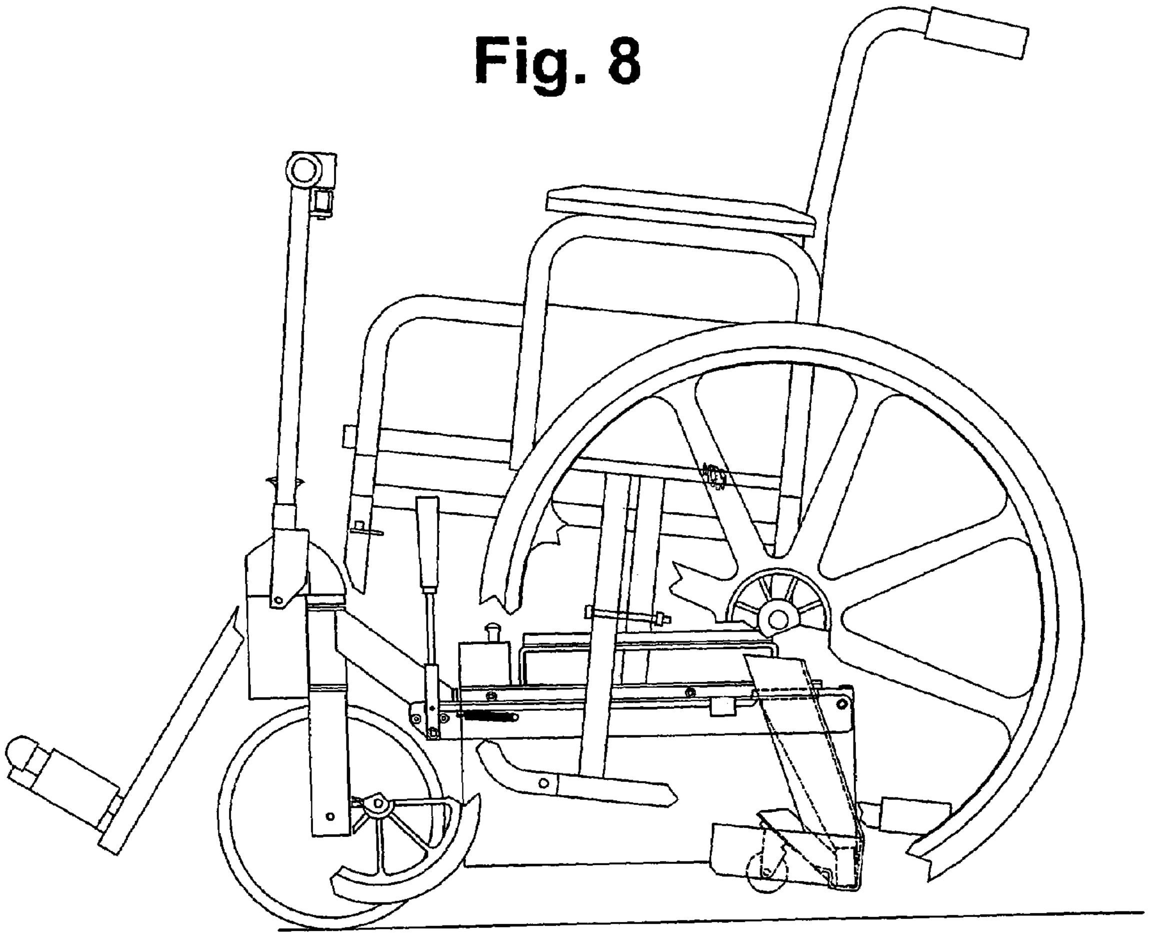
FIG. 8 is a side view with a cutaway depiction of the engagement of the swing arm assembly with the wheel chair mounting brackets in a final position.
Figure 16:
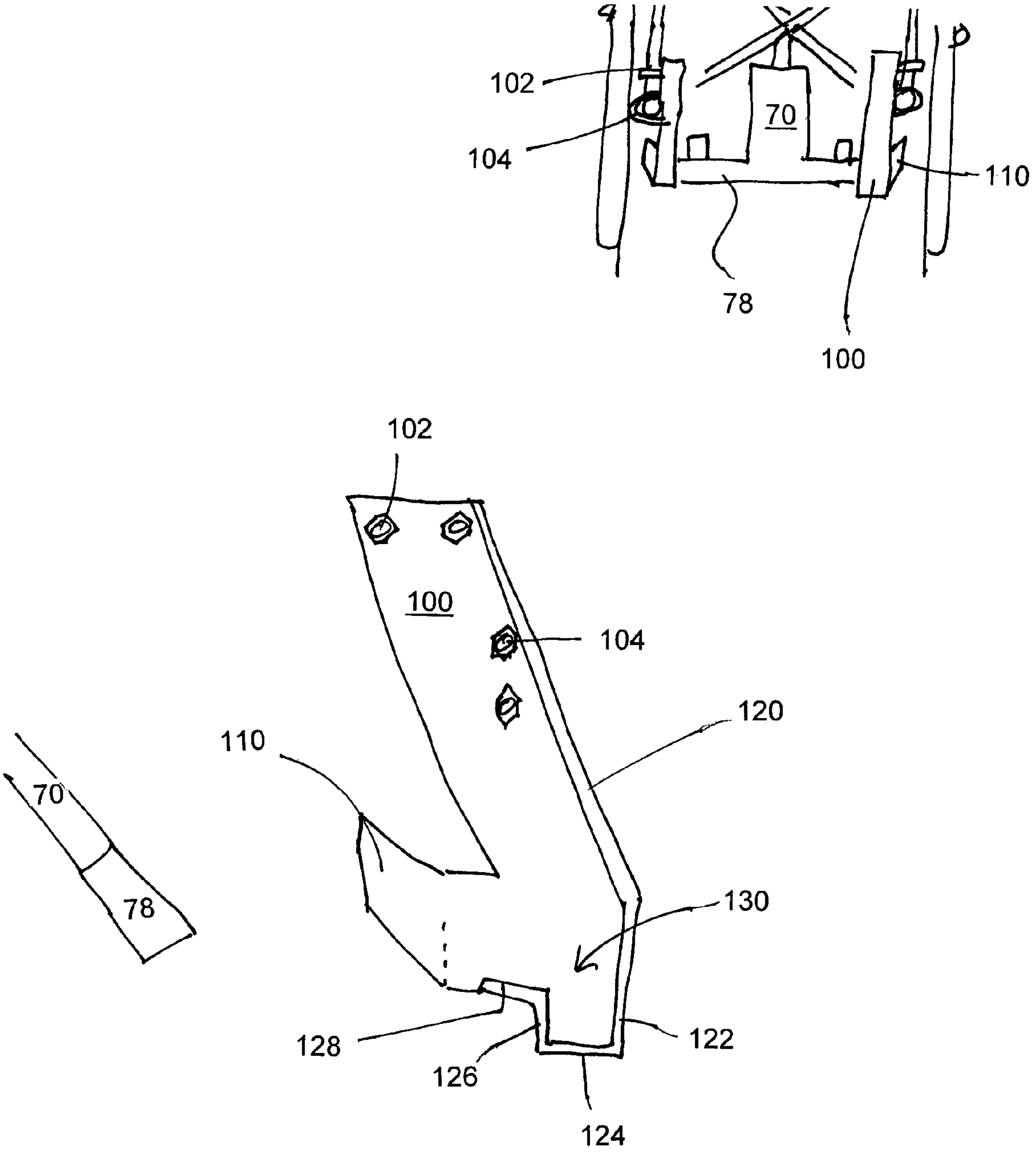
FIG. 16 is a close up view of a mounting bracket.
Figure 17:
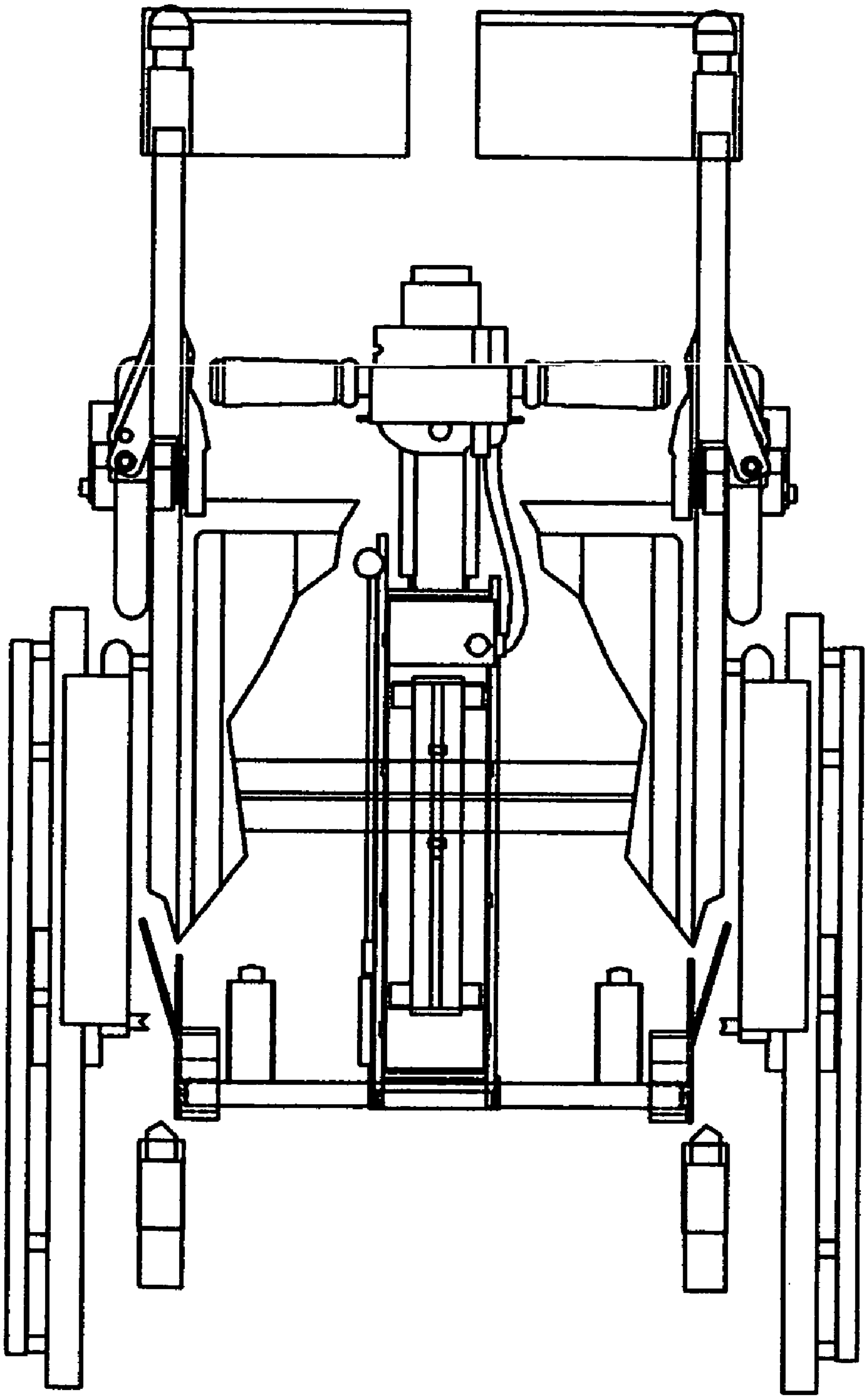
FIG. 17 is a top view of a wheel chair with a cut away.
Figure 18:
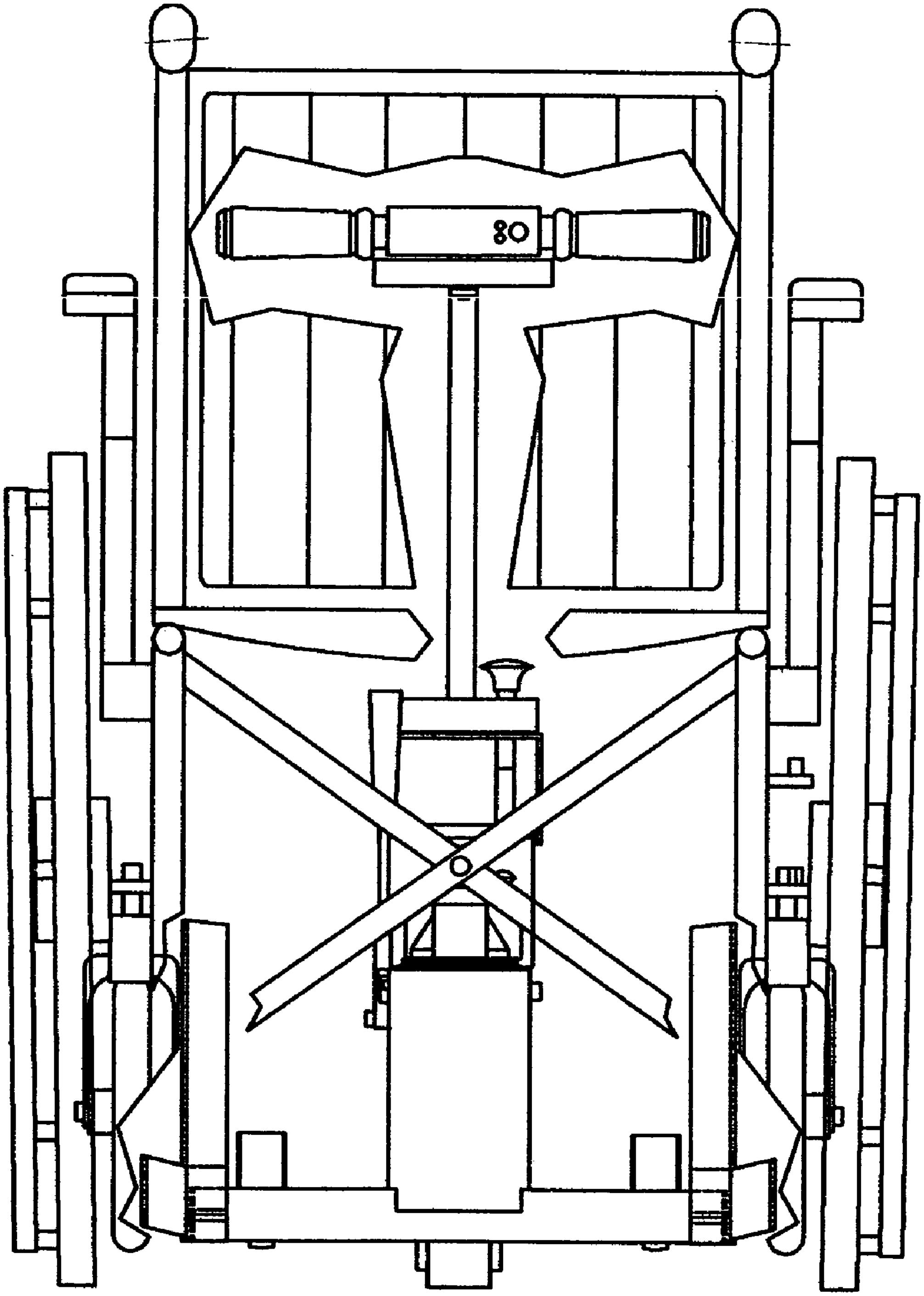
FIG. 18 is a rear view of a wheel chair with a cut away.

FIG. 16 depicts one swing assembly or caster lever mounting bracket 100. FIGS. 6, 7 and 8 depict the mounting brackets fixedly attached to wheel chair. Attachment devices, such as two U-bolts and their respective nuts are used to attach each mounting bracket 100 to the frame of the standard wheel chair. Alternative through holes (not shown) in mounting bracket 100 provide for the adaptability of mounting bracket 100 for attachment to a variety of standard wheel chair frames design.

The mounting bracket has a forward extension 110 which serves as a guide for assisting the engagement of the horizontal bar 78 of swing assembly with the mounting brackets. Because the guide flanges 110 are angled to be progressively wider at their forward aspect, the mounting bracket is able to receive the horizontal bar 78 from a range of directions. Accordingly, ease of engagement of the drive apparatus 10 with a wheel chair is achieved.

Mounting bracket 100 is designed with an engagement face 120 which is substantially at right angles to the side portion of mounting bracket 100 whereon the mounting U-bolts are attached. This engaging face 120 serves as a rearward stop for horizontal bar 78 during engagement. Towards the bottom of the mounting bracket 100 the engagement face 120 is configured with a rear stop engagement face 122, bottom support weight supporting face 124, forward locking face 126 and entry face 128. Together these components 122–126 comprise an engagement seat for horizontal bar 78. For a secure seat, the internal dimensions of faces 122, 124 and 126 are dimensioned to closely cooperate with the external faces of horizontal bar 78. Guide face 128 serves to guide horizontal bar 78 into seat 130 as it is being engaged with the wheel chair for operation.

Engagement operation is executed by setting up the wheel chair drive apparatus 10 on the ground, just in front of the wheel chair. With the wheel chair occupant in the wheel chair and the control shaft 40 in its upwards position, drive wheel 20 is held turned 90° to act as a brake. Swing assembly 70 is in its second "out" position with the casters engaged with the ground. In the second position of swing assembly 70 maintains the handle 18 of installed battery housing 14 at a first level. This first level is lower than the level of the wheel chair cross bars in a standard wheel chair. The wheel chair occupant manually moves his wheel chair forward until guide flanges 100 engage the rearwardly projecting horizontal bar 78 and guide it towards seat 130. When the horizontal bar 78 touches rear engaging face 122, continued forward motion of the wheel chair will cause swing assembly 70 to rotate in a clockwise direction as shown progressively in FIGS. 6, 7 and 8. The wheel chair drive of apparatus 10 is held against being pushed forward by the drive wheel, which is turned 90°. With further forward motion, horizontal bar 78 is pushed downwards so that the bottom of horizontal bar 78 progresses towards its seat against bottom engaging face 124. Swing assembly 70 continues to pivot clockwise direction until it rotates upwards into a substantially right angle to battery mounting rail 34. The locking notch 84 engages the lock slide 86 and pushes it forwards until lock slide spring 87 biases lock slide 86 into notch 84 and holds the swing assembly 70 in its right angle, first position. Simultaneously with this motion, the battery mounting brackets will be raised upwards. Along with the battery mounting rails being raised, battery 14 and its handle are raised. Handle 18 is dimensioned such that when the swing assembly 70 is in its first position, handle 18 engages the cross bar to the wheel chair frame and holds them in a weight supporting position. Also simultaneously with the rotation of swing assembly 70, casters 72 are rotated out of engagement with the ground.

Casters 72, being omni directional, operate with guide flanges 110 to facilitate an automatic mechanic adjustment of alignment as the swing assembly as the wheel chair and the mounting brackets are pushed into engagement with the swing assembly by the wheel chair operator.

Alternatively, the driver can be installed by setting the wheel chair brakes and backing the drive apparatus under the chair under power, which actuates the same mechanisms as described above.

Figure 11:
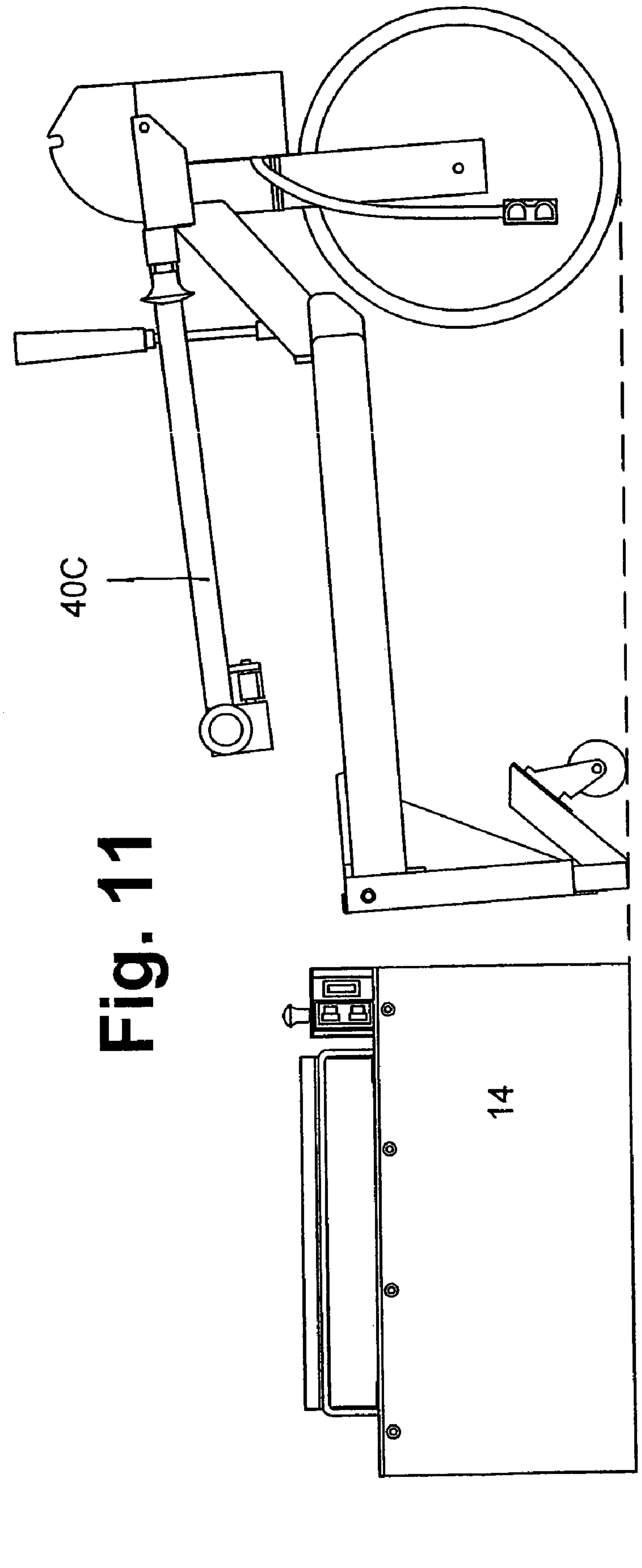
FIG. 11 is a right side view of the drive apparatus with the battery removed and the control shaft collapsed for storage.

Comparing FIG. 11 with FIG. 13 illustrates that when the swing assembly 70 is out and casters 72 deployed, the rear end of the drive apparatus 10 is lower than its front. Consequently, the rear end of the Delrin®acetal resin slide 19 on top of handle 18 is also lower than the x-frame member of the wheel chair, which allows the handle to slide under the x-frame easily. In FIG. 13, the swing assembly 70 is in, and also up, which raises the rear of the drive apparatus 10 and Delrin®acetal resin slide 19 into lifting engagement with the wheel chair at the x-frame member.

The weight supporting function of battery handle 18 is through its engagement with the cross bars of the wheel chair frame. This engagement is forward of the wheel chair's main wheels axle and forward of the center of gravity of the wheel chair with its occupant. Accordingly, raising of the wheel chair drive apparatus 10 by engagement of swing assembly 70 concomitantly raises the front casters of the wheel chair off the ground. This prevents interference of these wheels with the progress of the wheel chair with its bar style or main wheels or bar style or drive wheel 20 over minor obstacles. The wheel chair casters are only raised a small vertical distance however. Accordingly, they serve as anti-tip safety wheels or out riggers in the event of a sharp turn or hill or ramp that may otherwise threaten to tip the wheel chair and drive apparatus over.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, Thus, the breadth and scope of the present invention should not be limited by any of the above-described exemplary embodiments, but should be defined only in accordance with the following claims appended hereto and their equivalents.

What is claimed is:

1. A wheel chair drive apparatus comprising:

- a frame having a wheel mount, a battery mount, and a control shaft mount;
- a drive wheel having an axle;
- a drive motor incorporated within said drive wheel;
- a battery in operative communication with said drive motor via a detachable jack;
- a battery housing dimensioned to mount in said battery mount of said frame, said battery housing having a handle;
- a control shaft pivotably mounted on said control shaft mount, said control shaft having at least a stow position, and operating position, a user entry position and a table use position;
- a caster lever pivotably mounted to said frame, said caster lever having at least a rolling position and an engaged position, said caster lever being disposed to engage a receiving seat on a wheel chair;
- said caster lever having a wheel mounted thereon, said wheel being disposed to rollingly support said wheel chair drive apparatus when said caster lever is in said rolling position.

2. The wheel chair drive apparatus of claim 1 wherein said drive motor is coaxial with said drive wheel.

3. The apparatus of claim 1 wherein said caster lever further comprises a stop, said stop preventing rotation of said caster lever beyond said engaged position.

4. The apparatus of claim 1 wherein said wheel is mounted on a caster.

5. The wheel chair drive apparatus of claim 1 further comprising a tread attached to a circumferential ground contact surface.

6. The apparatus of claim 1 wherein said wheel is out of contact with the ground when said caster lever is in said engaged position.

7. The wheel chair drive apparatus of claim 1 wherein said drive motor has an efficiency of at least about 75%.

8. The wheel chair drive apparatus of claim 1 wherein said control shaft is continuously selectively positionable on said control shaft mount.

9. The wheel chair drive apparatus of claim 1 wherein said control shaft is mounted on said control shaft mount with a combination of a boss and a detent for selectively positioning said control shaft among a plurality of positions.

10. The wheel chair drive apparatus of claim 9 wherein said boss is spring loaded and mounted on said control shaft such that said spring may be manually moved from a rest position for disengaging said boss from a selected detent and said spring may be manually released for reengaging said boss with another selected detent.

11. The wheel chair drive apparatus of claim 1 wherein said control shaft has a throttle mounted near an upper aspect of said control shaft.

12. The wheel chair drive apparatus of claim 1 wherein said control shaft has a display mounted near an upper aspect of said control shaft.

13. The wheel chair drive apparatus of claim 12 wherein said display includes a LED.

14. The wheel chair drive apparatus of claim 12 wherein said display indicates a charge level of said battery.

15. The wheel chair drive apparatus of claim 1 wherein said battery is sealed within said battery housing.

16. The wheel chair drive apparatus of claim 1 wherein said battery and said battery housing together weigh less than about 30 pounds.

17. The wheel chair drive apparatus of claim 1 wherein said handle is dimensioned to raise a front portion of a frame of a standard wheel chair when said wheel chair drive apparatus is engaged with said wheel chair.

18. The wheel chair drive apparatus of claim 17 wherein a raised portion of said wheel chair maintains a front caster wheel of the wheel chair elevated above the ground.

19. The wheel chair drive apparatus of claim 1 wherein said handle of said battery housing is peaked.

20. The wheel chair drive apparatus of claim 19 wherein said peak is dimensioned to correspond to an X frame of a standard of wheel chair.

21. The wheel chair drive apparatus of claim 1 wherein said handle of said battery housing is made at least in part of Delrin®acetal resin.

22. The wheel chair drive apparatus of claim 1 wherein said receiving seat is fabricated into a caster lever mount.

23. The wheel chair drive apparatus of claim 22 wherein said caster lever mount is a separate component, and said caster lever mount is adapted for attachment to a standard wheel chair.

24. The wheel chair drive apparatus of claim 22 wherein said caster lever mount are two in number.

25. The wheel chair drive apparatus of claim 22 wherein said caster lever mount has guide wings.

26. The wheel chair drive apparatus of claim 22 wherein said caster lever mount has an engaging stop face.

27. The wheel chair drive apparatus of claim 22 wherein said caster lever mounts incorporates said receiving seat and said receiving seat is dimensioned to closely cooperate with a horizontal bar, said horizontal bar being a component of said caster lever.

28. The apparatus of claim 1 further comprising a locking lever releasably biased toward a position locking said caster lever in said engaged position.

29. The apparatus of claim 22 wherein said caster lever mount has a bottom support surface, said bottom support surface being disposed to support the weight of said wheel chair drive apparatus when said caster lever is in said engaged position.

* * * * *